United States Patent
Ringdahl et al.

(10) Patent No.: US 10,698,739 B2
(45) Date of Patent: *Jun. 30, 2020

(54) MULTITENANT ACCESS TO MULTIPLE DESKTOPS ON HOST MACHINE PARTITIONS IN A SERVICE PROVIDER NETWORK

(71) Applicant: VMware, Inc., Palo Alto, CA (US)

(72) Inventors: Kenneth Ringdahl, Pelham, NH (US); Charles Davies, Millis, MA (US); Andre Biryukov, Dracut, NH (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,691

(22) Filed: Sep. 19, 2016

(65) Prior Publication Data

US 2017/0010921 A1 Jan. 12, 2017

Related U.S. Application Data

(63) Continuation of application No. 13/413,867, filed on Mar. 7, 2012, now Pat. No. 9,467,305.

(51) Int. Cl.
*G06F 9/50* (2006.01)
*H04L 12/931* (2013.01)
(Continued)

(52) U.S. Cl.
CPC ........ *G06F 9/5077* (2013.01); *G06F 9/45537* (2013.01); *H04L 12/4641* (2013.01);
(Continued)

(58) Field of Classification Search
CPC ... H04L 12/4641; H04L 49/70; H04L 45/586; H04L 47/70; H04L 45/54; G06F 9/45537;
(Continued)

(56) References Cited

U.S. PATENT DOCUMENTS 6,175,867 B1 1/2001 Taghadoss
6,536,043 B1 3/2003 Guedalia
(Continued)

FOREIGN PATENT DOCUMENTS

EP 1259084 11/2002
EP 2 357 763 8/2011
WO 2013134439 9/2013

OTHER PUBLICATIONS

Fifth Office Action in U.S. Appl. No. 13/191,037, dated Apr. 10, 2015.
(Continued)

*Primary Examiner* — Peter P Chau
(74) *Attorney, Agent, or Firm* — Fish & Richardson P.C.

(57) ABSTRACT

Routers and host machines can host desktops for two or more enterprises. A virtual local area network is established for each enterprise. Each virtual local area network is connected to a plurality of host machines for the enterprise, with each host machine supporting desktops for use by the enterprise. The desktops access computer resources on the enterprise network of the enterprise to which it is connected. Resources within a host machine are shared by having a virtual switch for each enterprise the host machine supports. The virtual switch for an enterprise is connected to the virtual local area network of the enterprise. Desktops in the host machine that are allocated to the enterprise are given network addresses that include the tag for that enterprise. Virtual desktops for different enterprises can be hosted on different partitions of the same host machine.

20 Claims, 3 Drawing Sheets

(51) Int. Cl.
*H04L 12/713* (2013.01)
*H04L 12/46* (2006.01)
*G06F 9/455* (2018.01)
*H04L 12/741* (2013.01)
*H04L 12/911* (2013.01)

(52) U.S. Cl.
CPC ............ *H04L 45/54* (2013.01); *H04L 45/586* (2013.01); *H04L 47/70* (2013.01); *H04L 49/70* (2013.01); *G06F 2209/504* (2013.01); *Y02D 10/22* (2018.01)

(58) Field of Classification Search
CPC ............. G06F 9/5077; G06F 2209/504; Y02B 60/142
See application file for complete search history.

(56) References Cited

U.S. PATENT DOCUMENTS

| | | |
|---|---|---|
| 6,615,357 B1 | 9/2003 | Boden |
| 7,516,255 B1 | 4/2009 | Hobbs |
| 7,590,750 B2 | 9/2009 | Adbo |
| 7,802,000 B1 | 9/2010 | Huang |
| 7,948,922 B2 | 5/2011 | Pang |
| 8,014,308 B2 | 9/2011 | Gates |
| 8,170,123 B1 | 5/2012 | Hobgood |
| 8,281,377 B1 | 10/2012 | Snow |
| 8,307,362 B1 | 11/2012 | Gong |
| 8,725,886 B1 | 5/2014 | Pulier et al. |
| 8,893,267 B1 * | 11/2014 | Sathe ................ G06F 21/31 711/153 |
| 8,959,338 B2 | 2/2015 | Snow et al. |
| 8,990,824 B2 * | 3/2015 | Nilakantan ......... G06F 9/45558 709/220 |
| 9,253,158 B2 | 2/2016 | Ringdahl et al. |
| 9,407,613 B2 | 8/2016 | Hobgood et al. |
| 9,467,305 B2 * | 10/2016 | Ringdahl ............ H04L 12/4641 |
| 9,614,748 B1 | 4/2017 | Battersby et al. |
| 2002/0069369 A1 | 6/2002 | Tremain |
| 2003/0115344 A1 | 6/2003 | Tang et al. |
| 2003/0135578 A1 | 7/2003 | Banga |
| 2004/0175046 A1 | 9/2004 | Gormish |
| 2004/0181796 A1 | 9/2004 | Fedotov |
| 2004/0207723 A1 | 10/2004 | Davis |
| 2005/0198379 A1 | 9/2005 | Panasyuk |
| 2005/0289613 A1 | 12/2005 | Lawrence |
| 2006/0002315 A1 | 1/2006 | Theurer et al. |
| 2006/0026293 A1 | 2/2006 | Virdi |
| 2006/0031225 A1 | 2/2006 | Palmeri |
| 2006/0090136 A1 | 4/2006 | Miller |
| 2006/0203007 A1 | 9/2006 | Bullard et al. |
| 2006/0242641 A1 * | 10/2006 | Kinsey ................ G06F 9/5077 718/1 |
| 2007/0097130 A1 | 5/2007 | Margulis |
| 2007/0124474 A1 | 5/2007 | Margulis |
| 2007/0162945 A1 | 7/2007 | Mills |
| 2007/0162968 A1 | 7/2007 | Ferreira et al. |
| 2007/0220168 A1 | 9/2007 | Parsons et al. |
| 2007/0226762 A1 | 9/2007 | Girgis |
| 2008/0013916 A1 | 1/2008 | Sharpe |
| 2008/0043764 A1 | 2/2008 | Ishizaki |
| 2008/0080396 A1 | 4/2008 | Meijer |
| 2008/0080552 A1 | 4/2008 | Gates et al. |
| 2008/0170622 A1 | 7/2008 | Gordon |
| 2008/0240122 A1 | 10/2008 | Richardson |
| 2008/0267187 A1 | 10/2008 | Kulamala |
| 2008/0301566 A1 | 12/2008 | Abdo |
| 2008/0313278 A1 | 12/2008 | Hochberg |
| 2009/0144393 A1 * | 6/2009 | Kudo .................... G06F 9/5044 709/218 |
| 2009/0144515 A1 * | 6/2009 | Benari ................ G06F 9/4443 711/162 |
| 2009/0177996 A1 | 7/2009 | Hunt |
| 2009/0178006 A1 | 7/2009 | Lemay |
| 2009/0248802 A1 | 10/2009 | Mahajan |
| 2009/0248869 A1 | 10/2009 | Ghostine |
| 2009/0276771 A1 | 11/2009 | Nickolov et al. |
| 2010/0037310 A1 | 2/2010 | Turley |
| 2011/0090910 A1 * | 4/2011 | Tripathi .................. H04L 49/00 370/395.1 |
| 2011/0090911 A1 | 4/2011 | Hao |
| 2011/0119390 A1 | 5/2011 | Leech et al. |
| 2011/0142053 A1 * | 6/2011 | Van Der Merwe ..... H04L 47/72 370/395.1 |
| 2011/0283278 A1 * | 11/2011 | Murrell .................. G06F 9/5077 718/1 |
| 2012/0014387 A1 * | 1/2012 | Dunbar ............... H04L 12/4625 370/395.53 |
| 2012/0042054 A1 * | 2/2012 | Kotha ................... G06F 9/45558 709/220 |
| 2012/0147894 A1 * | 6/2012 | Mulligan ............ G06F 9/45533 370/395.53 |
| 2012/0213294 A1 | 8/2012 | Hobgood |
| 2013/0174242 A1 | 7/2013 | Snow et al. |
| 2013/0235874 A1 | 9/2013 | Ringdahl et al. |
| 2015/0058967 A1 | 2/2015 | Ringdahl |

OTHER PUBLICATIONS

First Office Action in U.S. Appl. No. 13/413,867, dated Apr. 8, 2015.
Third Office Action in U.S. Appl. No. 13/191,037, dated Mar. 26, 2014.
Fourth Office Action in U.S. Appl. No. 13/191,037, dated Oct. 2, 2014.
Office Action in U.S. Appl. No. 12/424,247 dated Apr. 17, 2012.
Office Action in U.S. Appl. No. 12/424,314 dated Aug. 4, 2011.
Office Action in U.S. Appl. No. 13/632,202 dated Aug. 2, 2013.
Search report in PCT patent application PCT/US2013/029462 dated Oct. 16, 2013.
Unpublished U.S. Appl. No. 13/191,037, filed Jul. 26, 2011.
First Office Action in U.S. Appl. No. 13/191,037, dated Jan. 10, 2013.
Second Office Action in U.S. Appl. No. 13/191,037, dated Oct. 28, 2013.
Unpublished U.S. Appl. No. 13/974,774, filed Aug. 23, 2013.
"MPLS/BGP Virtual Private Networks", 13 pages, copyright 2002, Spirent plc.
"Virtual Routing", Version 1.21-r5, copyright 2005, Interpeak AB.
"MPLS VPN—VRF Selection Based on Source IP Address". 18 pages, Cisco IOS Release 12.0(22)S, dated 2007.
Interpeak Secure Networking Software, "Virtual Routing" Bringing TCP/IP to a New Level, 2005.
Office Action in U.S. Appl. No. 13/461,380, dated Jun. 18, 2015.
Office Action in U.S. Appl. No. 13/974,774, dated Jul. 16, 2015.
Office Action in U.S. Appl. No. 13/461,380, dated Jul. 2, 2014.
Notice of Allowance in U.S. Appl. No. 13/632,202, dated Jul. 10, 2014.
Final Office Action in U.S. Appl. No. 13/461,380, dated Nov. 5, 2014.
First office action in U.S. Appl. No. 13/461,380, dated Jun. 30, 2014.
European Communication in European Application No. 13750974.1, dated Feb. 27, 2018, 5 pages.

* cited by examiner

MULTITENANT ACCESS TO MULTIPLE DESKTOPS ON HOST MACHINE PARTITIONS IN A SERVICE PROVIDER NETWORK

CROSS REFERENCE TO RELATED APPLICATIONS

This application is a continuation of and claims priority to U.S. patent application Ser. No. 13/413,867, filed on Mar. 7, 2012, the entire contents of which are hereby incorporated by reference.

BACKGROUND

It is common for an enterprise to use a service provider to host computer resources, such as servers, applications and desktops. Typically, the service provider has multiple computers, each of which is running one or more virtual machines. A virtual machine may host, for example, a server, or an application, or an entire desktop. An enterprise may have a service provider host many virtual machines.

In order to integrate a hosted desktop within an enterprise, the hosted desktop is assigned a network address that is consistent with the network addressing plan within the enterprise. In other words, the enterprise specifies the addresses of desktops that are hosted within a service provider; the service provider does not dictate the desktop addressing plan to the enterprise. To host an enterprise's desktops, the service provider communicates directly with agent software in the hosted desktop. In other words, the service provider uses the address space specified by the enterprise, and works within the enterprise's existing addressing plan.

Because of the Internet's limited address space, it is highly probably that large enterprises are using a private address space (as defined in RFC 1918) for internal addressing requirements. Further, it is highly probably that different enterprises are using the same private address ranges. (e.g., two enterprises may both address themselves using 192.168.0.0/16.). As a result, a service provider generally segregates resources for each enterprise that it hosts. In particular, each host machine is allocated statically to a single tenant.

SUMMARY

Capital resources of a service provider can be more efficiently utilized by sharing some amount of infrastructure among enterprise tenants. For example, routers and host machines can be designed such that desktops can be hosted for two or more enterprises.

A virtual local area network is established for each enterprise. Each virtual local area network is connected to a plurality of host machines for the enterprise, with each host machine supporting desktops for use by the enterprise. The desktops in turn access the computer resources on the enterprise network of the enterprise to which it is connected.

To eliminate network conflicts, a router is connected to the enterprise networks of the multiple enterprises. A virtual router is established for each enterprise, including a distinct routing table for each enterprise, for routing traffic between the desktops hosted on the plurality of host machines and the computer resources on the enterprise networks.

As an example, a router can tag network addresses in packets received by the router based on a physical, or virtual port on the router on which the packet is received and the enterprise assigned to that physical port. A separate virtual routing and forwarding (VRF) table can be created for each enterprise. The router connects to a virtual local area network (VLAN) for the enterprise, with different enterprises having their network addresses tagged differently. In effect, the router is virtualized. A VRF-enabled router can be used for such an implementation.

With such an implementation, host machines can be reallocated dynamically to different enterprises by changing the network address of the host machine to include the tag for the corresponding enterprise.

To allow resources within the host machine to be shared, a host machine includes a port group within a virtual switch for each enterprise it supports. The virtual switch for an enterprise is connected to the virtual local area network of the enterprise. Desktops in the host machine that are allocated to the enterprise are given network addresses that include the tag for that enterprise. The virtual switch ensures that only packets intended for an enterprise's desktop are seen only in that enterprise's network.

With this architecture, virtual desktops for different enterprises can be hosted on different partitions of the same host machine, thus allowing the resources on one machine to be shared among multiple tenants of a service provider.

When a host is partitioned in this manner, and shared among multiple tenants, the usage of the host by one tenant could affect the performance of the host experienced by another tenant. To mitigate the impact of one tenant's usage on the performance of the host for other tenants, each tenant can have its desktops pinned to one or more physical CPU's, separate from the physical CPU's used by other tenants. An alternative way to address this potential problem is to allocate shares of CPU resources to each virtual machine or to dynamically control bursting, or sudden increase, of CPU usage of individual machines, thus providing greater CPU resources to a desktop than may ordinarily be possible. A resource manager that is monitoring the resources of each virtual machine on a host can control the throttling of the CPU to ensure an acceptable quality of service to all desktops for all enterprises that may be sharing a host.

DETAILED DESCRIPTION

Figure 1:
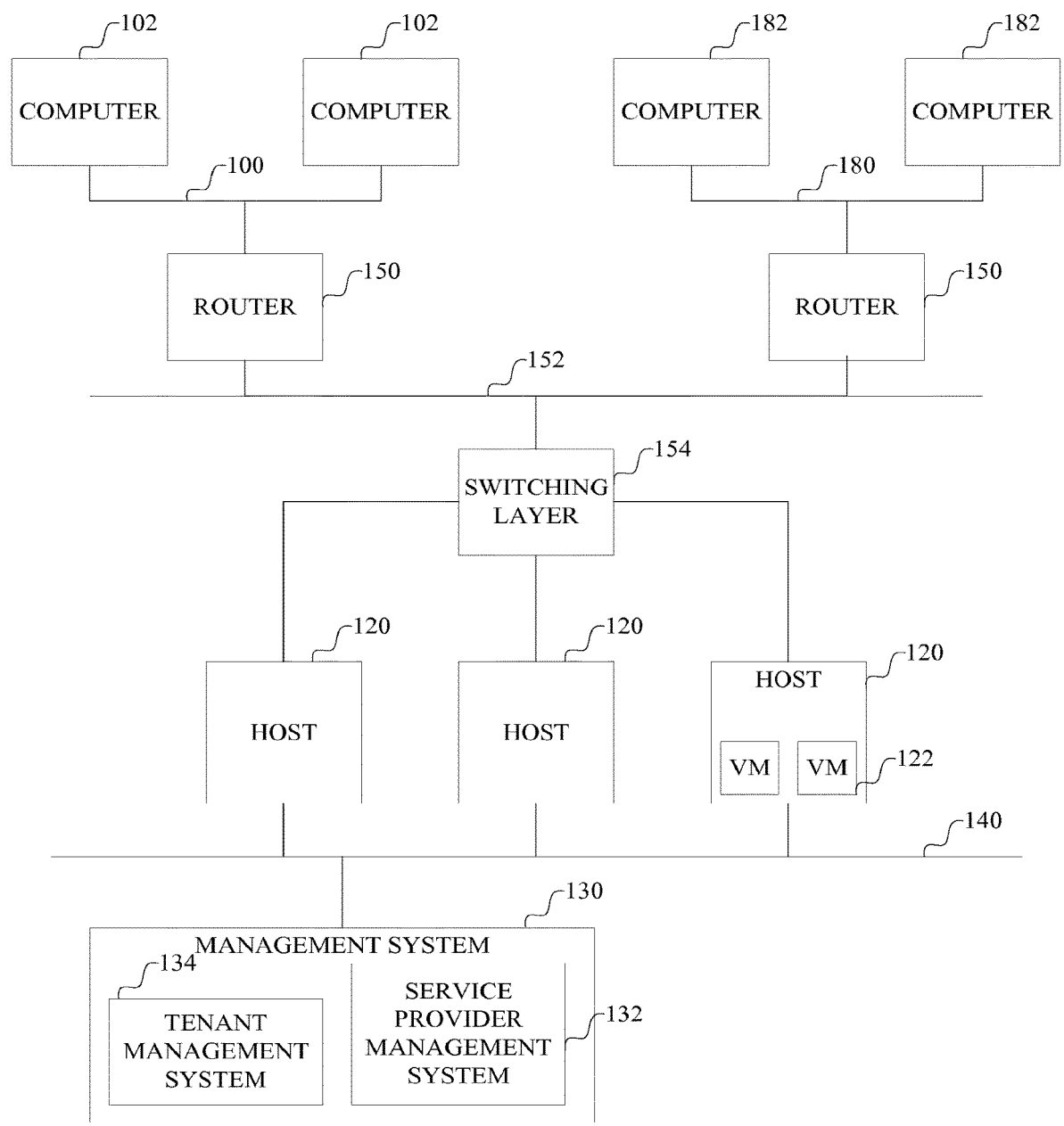
FIG. 1 is a block diagram of a service provider infrastructure with host machines supporting multiple virtual machines for multiple enterprises.

Referring now to FIG. 1, a block diagram of a service provider infrastructure with host machines supporting multiple virtual machines for multiple enterprises will now be described.

A first enterprise, such as a corporation, has its own computer network 100 through which computers 102 and other resources of the enterprise communicate. The computer network 100 can be any combination of local area networks and wide area networks.

A second enterprise has its own computer network 180 through which computers 182 and other resources of the second enterprise communicate. The computer network 180 can be any combination of local area networks and wide area networks.

Through one or more routers 150, the computer networks 100, 180 are connected to a computer network 152, on which multiple virtual local area networks (VLANs) are implemented.

To eliminate network conflicts, for each router that is connected to multiple enterprise networks 100, 180, a virtual router is established for each enterprise. The virtual router includes a distinct routing table for each enterprise. As an example, a router can tag network addresses in packets received by the router based on a physical or virtual port on the router on which the packet is received and the enterprise assigned to that port. A separate virtual routing and forwarding (VRF) table can be created for each enterprise. The router connects to the virtual local area network (VLAN) for the enterprise, with different enterprises having their network addresses tagged differently. In effect, the router is vilivalized. A VRF-enabled router can be used for such an implementation. For example, a Multiprotocol Label Switching (MPLS)-enabled router can be used, in which case physical ports are assigned to enterprises. As another example, a router suppoliing IPSec tunnels, with an IPSec tunnel assigned to each enterprise can be used, in which case the ports assigned to an enterprise are virtual.

In an example implementation, the router tags network addresses in packets received by the router from an enterprise based on a physical or virtual port on the router on which the packet is received and the enterprise assigned to that port. The packets with tagged addresses are output from the router to the virtual local area network for that enterprise. Similarly, when the router receives a packet with a tagged address from the virtual local area network for an enterprise, it strips the tagging and outputs the packet on the port assigned to the enterprise corresponding to the tag.

Through a switching layer 154, the VLANs connect to multiple host computers 120. Each of the host computers 120 can run one or more virtual machines 122. A virtual machine 122 can run, for example, a desktop, and manage the interaction between a remote computer on an enterprise network and the desktop. A virtual machine also can run an application or a server.

To allow resources within the host machine to be shared, a host machine includes a port group within a virtual switch for each enterprise it supports. The virtual switch for an enterprise is connected to the virtual local area network of the enterprise. Desktops in the host machine that are allocated to the enterprise are given network addresses that include the tag for that enterprise and are associated with the virtual switch for that enterprise. The vilival switch ensures that only packets intended for an enterprise's desktop are seen only in that enterprise's network.

The service provider infrastructure also includes a management system 130 connected to host computers 120, separately from the enterprise networks through a backbone network 140. The management system 130 can include one or more computers. A service provider management tool 132 is used to allocate infrastructure capacity to an enterprise. A tenant management tool 134 is used to allocate desktop capacity. The service provider management tool is not connected to the enterprises' virtual area networks, but instead connects to host machines or other resources through a separate network, the backbone network 140. Thus, the service provider does not have access to an enterprise's resources or desktops on the host machines. The tenant management tool, on the other hand has access to the virtual area network of the enterprise, to allocate desktops within the quotas established with the service provider.

As an example implementation of the system illustrated in FIG. 1, some data structures for tracking host usage will now be described.

Figure 2:
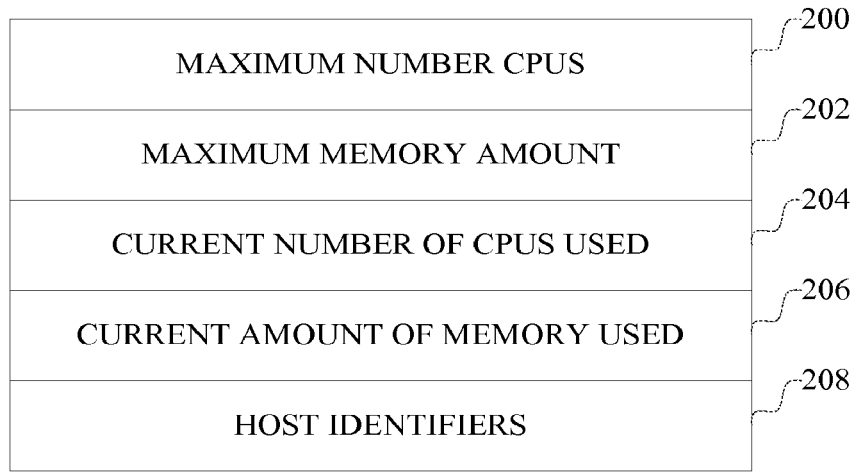
FIG. 2 is an illustration of an example desktop model quota data structure.

A desktop model quota data structure shown in FIG. 2 can be used to track information about allocated resources. As an example, this data structure can include information such as: a maximum number 200 of central processing units (CPUs) supporting virtual machines (VMs), a maximum amount 202 of memory for each virtual machine, the current number 204 of CPUs used, a current amount 206 of memory used, and host identifiers 208 that can be assigned to VMs when desktops are provisioned on them.

Figure 3:
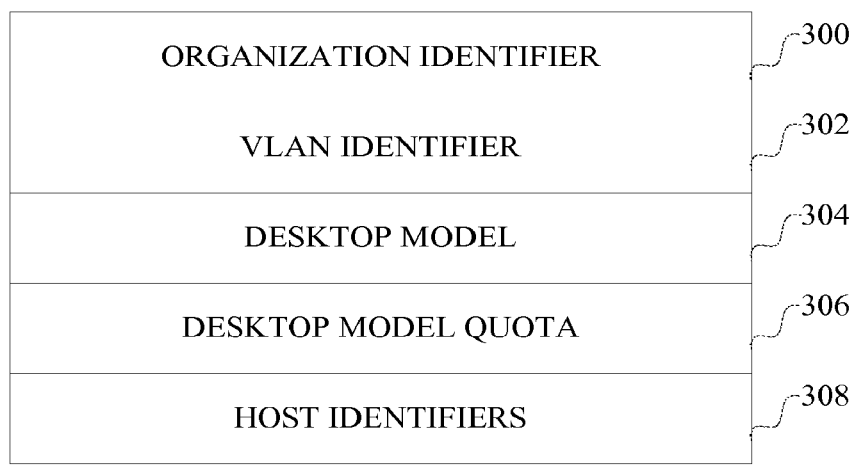
FIG. 3 is an illustration of data associated with an enterprise.

As shown in FIG. 3, the service provider associates this desktop model quota 306 with an enterprise, which also has an organization identifier 300 and a virtual local area network (VLAN) identifier 302 (which is stored as part of the host configuration information). Thus, the combination of the organization identifier 302, virtual local area network identifier 308 and host identifiers relates all of the resources together for an enterprise. A desktop model 304, defining parameters of the desktops to be allocated, also is associated with an organization identifier and thus an enterprise.

To determine the host identifiers that can be associated with a desktop model quota, a process for retrieving the available hosts is implemented. This process receives the organization identifier and the desktop identifier and generates a list of available hosts that are capable of suppoliing the identified desktop model.

Figure 4:
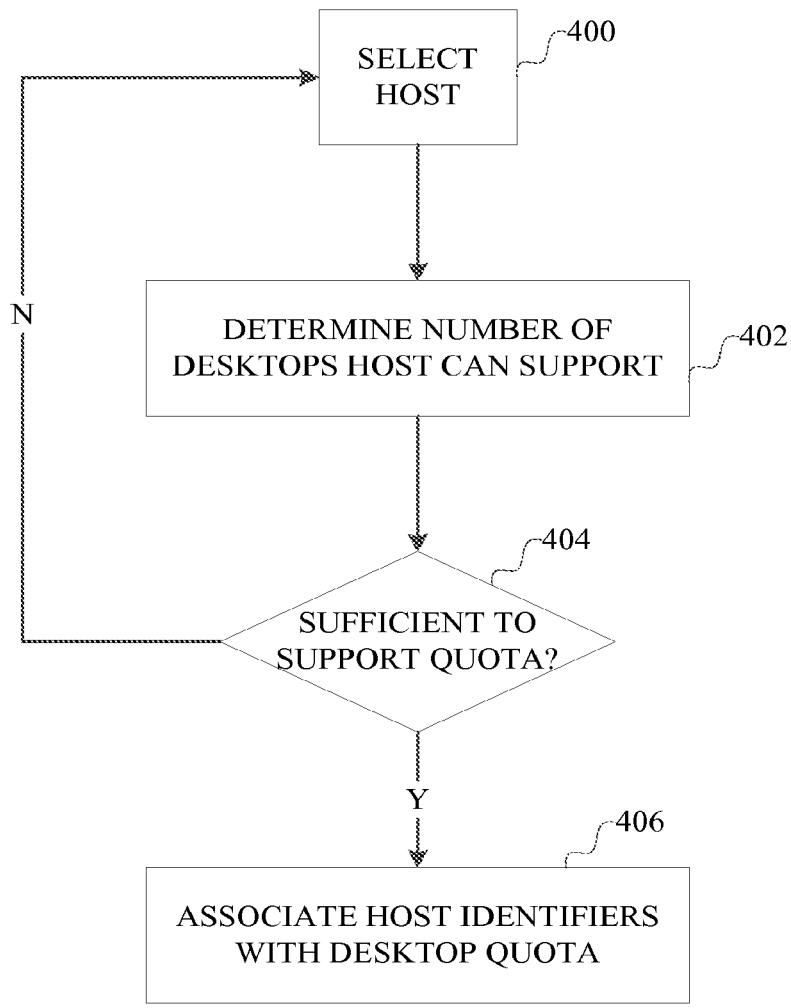
FIG. 4 is a flow chart describing an example process through which available hosts are identified.

The process of identifying available hosts can cycle through each host in the system that is capable of being connected to the enterprise's VLAN. For example, referring to FIG. 4, for each selected (400) host, it is determined 402 how many desktops it can support, if any. These steps are repeated for each host until enough host capacity has been identified to suppoli the desktop model quota, as indicated at 404. The identified hosts are then associated 406 with the desktop model quota.

To associate each virtual machine on a host with the enterprise, a VLAN name for the enterprise's VLAN is identified. The network label for the network adapter associated with the virtual machine is set to the VLAN name for the enterprise to which it is allocated. Thus all VM's belonging to the same tenant in a data center carry the same label. The VLAN name can be used to retrieve the VLAN identifier which is available from the host configuration information.

In addition to the foregoing, each host can have a data structure that maintains information to allow it to track usage and capacity metrics. The host data structure includes, but is not limited to, a marker indicating whether the host is shared (partitioned) or not, an indication of a memory over-allocation rate used in calculating the memory capacity of the host, a VM ratio indicating the ratio of virtual to physical machines (used in calculating the CPU capacity of the host), the CPU capacity of the host (calculated by the product of the total number of CPUs and the VM ratio), and the memory capacity of the host (calculated by the product of the total memory of the host by the memory over-allocation rate).

Given this infrastructure, additional methods can be provided for determining the current usage of a host or of a tenant. For example, information about the currently active virtual machines on each host can be retrieved. These can then be filtered by their VLAN identifier to segregate them by tenant. The methods can be implemented in the management system.

With this architecture, virtual desktops for different enterprises can be hosted on different partitions of the same host machine, thus allowing the resources on one machine to be shared among multiple tenants of a service provider.

When a host is partitioned in this manner, and shared among multiple tenants, the usage of the host by one tenant could affect the performance of the host experienced by another tenant. To mitigate the impact of one tenant's usage on the performance of the host for other tenants, each tenant can have its desktops pinned to one or more physical CPU's, separate from the physical CPU's used by other tenants. An alternative way to address this potential problem is to allocate shares of CPU resources to each virtual machine or to dynamically control bursting of CPU usage of individual machines, thus providing greater CPU resources to a desktop than may ordinarily be possible. A resource manager that is monitoring the resources of each virtual machine on a host can control the throttling of the CPU to ensure an acceptable quality of service to all desktops for all enterprises that may be sharing a host.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor or other circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in special purpose logic circuitry.

A computing system can include clients and servers. A client and server are generally remote from each other and typically interact over a communication network. The relationship of client and server arises by virtue of computer programs running on the respective computers and having a client-server relationship to each other.

Having described an example embodiment, it should be apparent to those skilled in the art that the foregoing is merely illustrative and not limiting, having been presented by way of example only. Numerous modifications and other embodiments are with the scope of ordinary skill in the art and are contemplated as falling with the scope of the invention.

What is claimed is:

1. A system comprising:
   a plurality of host machines, each host machine being configured to host a plurality of virtual desktops,
      the plurality of host machines including a first host machine, wherein the first host machine is partitioned to host a first group of virtual desktops allocated to a first enterprise and accessible by one or more computers associated with the first enterprise and a second group of virtual desktops allocated to a second enterprise and accessible by one or more computers associated with the second enterprise, the first host machine further comprising a first virtual switch coupled to a first virtual local area network (VLAN) for the first enterprise and a second virtual switch coupled to a second VLAN for the second enterprise, and wherein the first group of virtual desktops of the first enterprise hosted on the first host machine are assigned network addresses associated with the first virtual switch and the second group of virtual desktops of the second enterprise hosted on the first host machine are assigned network addresses associated with the second virtual switch such that communication packets from the first VLAN of the first enterprise to the first group of virtual desktops are isolated from communication packets from the second VLAN of the second enterprise and the second group of virtual desktops, and
      wherein physical resources of the first host machine associated with the first group of virtual desktops are separate from physical resources of the first host machine that are associated with the second group of virtual desktops such that performance of the first group of virtual desktops of the first host machine and allocated to the first enterprise is not affected by resource usage by the second group of virtual desktops that share the first host machine and are allocated to the second enterprise.

2. The system of claim 1, further comprising:
   one or more switches configured to route packets received from respective enterprise computers to corresponding virtual desktops, wherein a first switch includes a first virtual switch associated with the first enterprise and a second virtual switch associated with the second enterprise.

3. The system of claim 1, further comprising:
   one or more routers, wherein each router couples two or more enterprise networks and wherein each router includes a corresponding virtual router for each enterprise.

4. The system of claim 3, wherein each virtual router includes a distinct routing table for each enterprise.

5. The system of claim 3, wherein each virtual router is configured to route traffic between virtual desktops allocated to a particular enterprise and computer resources on one or more computers associated with the particular enterprise.

6. The system of claim 1, further comprising a resource manager operating on a computer and configured to manage allocation of host machines to enterprises and virtual desktops to enterprises.

7. The system of claim 5, wherein allocating at least a portion of a host machine to a particular enterprise includes retrieving available host machines and determining a number of virtual desktops each available host machine can support.

8. The system of claim 1, wherein separating physical resources for virtual desktops associated with each enterprise includes allocating particular shares of CPU resources to each virtual desktop and adjusting shares of CPU resources based on monitored resource usage by each virtual desktop.

9. A method comprising:
  allocating a first plurality of virtual desktops of a host machine to a first enterprise, wherein the host machine is partitioned to include a second plurality of virtual desktops associated with a second enterprise, the allocating including:
    determining that the host machine has available resource to support the first plurality of virtual desktops;
    allocating physical resources of the host machine to the first plurality of virtual desktops, wherein allocating physical resources of the host machine includes allocating distinct physical CPUs of the host machine to the first plurality of virtual desktops associated with the first enterprise that are different from physical CPUs of the host machine allocated to the second plurality of virtual desktops associated with the second enterprise such that performance of the second plurality of virtual desktops of the second enterprise is not affected by resource usage of the first plurality virtual desktops; and
    associating each of the first plurality of virtual desktops with the first enterprise using a first virtual switch of the host machine including assigning each of the first plurality of virtual desktops network addresses associated with the first virtual switch and associating each of the second plurality of virtual desktops with the second enterprise using a second virtual switch of the host machine including assigning each of the second plurality of virtual desktops network addresses associated with the second virtual switch such that communication packets from the first enterprise to the first group of virtual desktops are isolated from communication packets from the second enterprise and the second group of virtual desktops.

10. The method of claim 9, wherein the allocating the first plurality of virtual desktops further includes:
  associating the first plurality of virtual desktops with one or more virtual switches configured to route packets between respective computers of the first enterprise and the first plurality of virtual desktops.

11. The method of claim 9, wherein determining that the host machine has available resource to support the first plurality of virtual desktops comprises retrieving a list of available host machines and determining a number of virtual desktops that can be supported by each host machine until enough host capacity has been identified.

12. The method of claim 9, comprising managing allocation of host machines to enterprises and virtual desktops to enterprises.

13. The method of claim 9, wherein the first enterprise is associated with a desktop model quota, wherein the desktop model quota includes information associated with resources allocated to the first enterprise.

14. The method of claim 13, wherein the desktop model quota is associated with an organization identifier of the first enterprise and a virtual local network identifier of the first enterprise so that the combination of the organization identifier, virtual local area network identifier, and host machine identifiers relate resources for the first enterprise.

15. The method of claim 14, comprising maintaining a mapping in memory of the organization identifier, virtual local area network identifier, and allocated resources from one or more host machines.

16. The method of claim 14, wherein each virtual desktop allocated to the first enterprise on the host machine is tagged with the virtual local network identifier for the first enterprise.

17. A non-transitory computer-readable storage medium comprising computer program instructions that when executed by one or more processors are configured to perform operations comprising:
  allocating a first plurality of virtual desktops of a host machine to a first enterprise, wherein the host machine is partitioned to include a second plurality of virtual desktops associated with a second enterprise, the allocating including:
    determining that the host machine has available resource to support the first plurality of virtual desktops;
    allocating physical resources of the host machine to the first plurality of virtual desktops, wherein allocating physical resources of the host machine includes allocating distinct physical CPUs of the host machine to the first plurality of virtual desktops associated with the first enterprise that are different from physical CPUs of the host machine allocated to the second plurality of virtual desktops associated with the second enterprise such that performance of the second plurality of virtual desktops of the second enterprise is not affected by resource usage of the first plurality virtual desktops; and
    associating each of the first plurality of virtual desktops with the first enterprise using a first virtual switch of the host machine including assigning each of the first plurality of virtual desktops network addresses associated with the first virtual switch and associating each of the second plurality of virtual desktops with the second enterprise using a second virtual switch of the host machine including assigning each of the second plurality of virtual desktops network addresses associated with the second virtual switch such that communication packets from the first enterprise to the first group of virtual desktops are isolated from communication packets from the second enterprise and the second group of virtual desktops.

18. The computer-readable storage medium of claim 17, wherein the allocating the first plurality of virtual desktops further includes:
  associating the first plurality of virtual desktops with one or more virtual switches configured to route packets between respective computers of the first enterprise and the first plurality of virtual desktops.

19. The computer-readable storage medium of claim 17, wherein determining that the host machine has available resource to support the first plurality of virtual desktops comprises retrieving a list of available host machines and determining a number of virtual desktops that can be supported by each host machine until enough host capacity has been identified.

20. The computer-readable storage medium of claim 17, wherein the instructions when executed are further configured to perform operations comprising managing allocation of host machines to enterprises and virtual desktops to enterprises.

* * * * *